Figure 1:
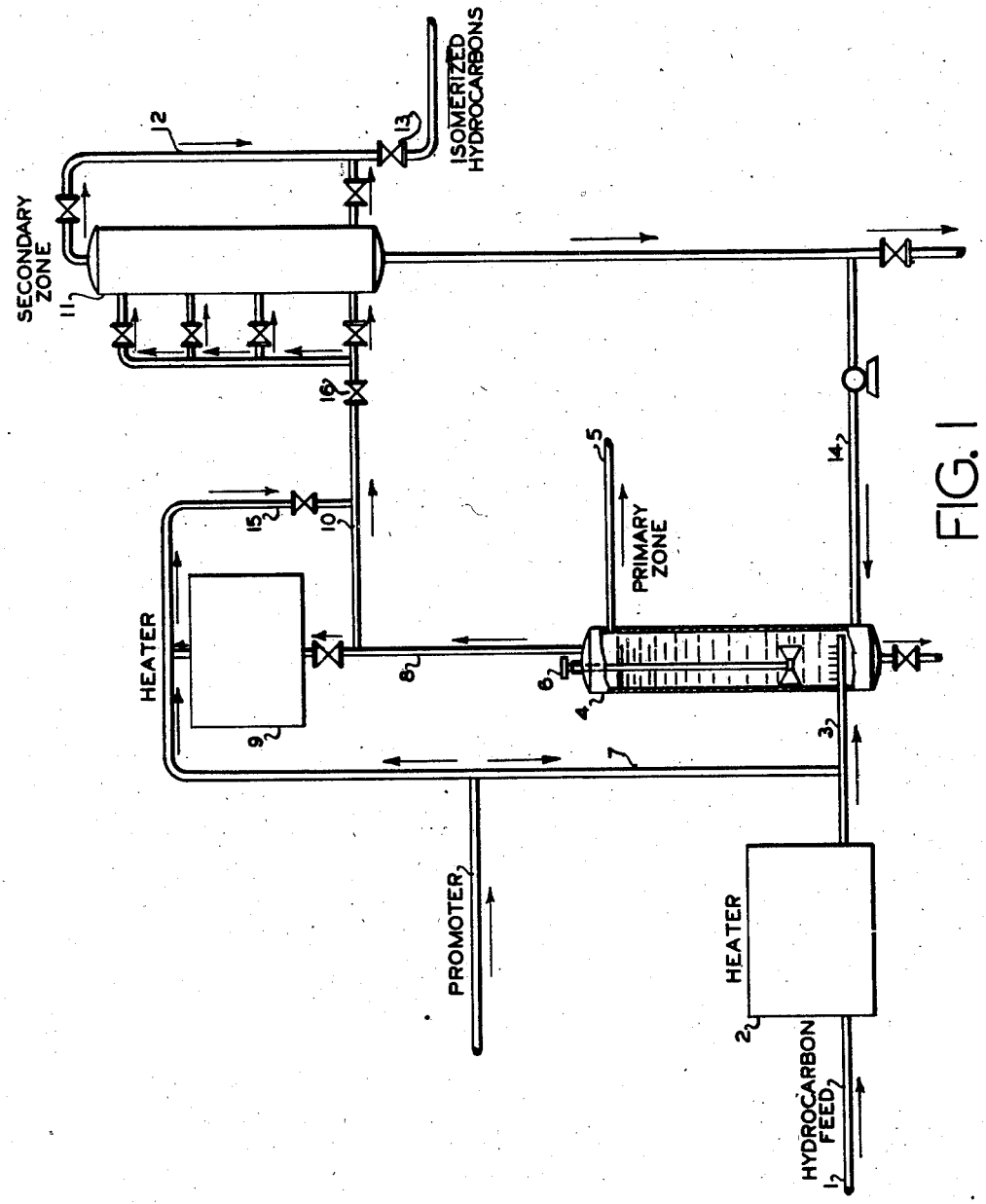

March 11, 1947. J. R. CALLAWAY 2,417,187
CATALYTIC ISOMERIZATION OF SATURATED HYDROCARBONS IN
THE PRESENCE OF AN ALUMINUM HALIDE-HYDROCARBON
COMPLEX SATURATED WITH ALUMINUM HALIDE
Filed May 28, 1943 2 Sheets-Sheet 1

JOHN R. CALLAWAY
INVENTOR

BY

HIS ATTORNEY

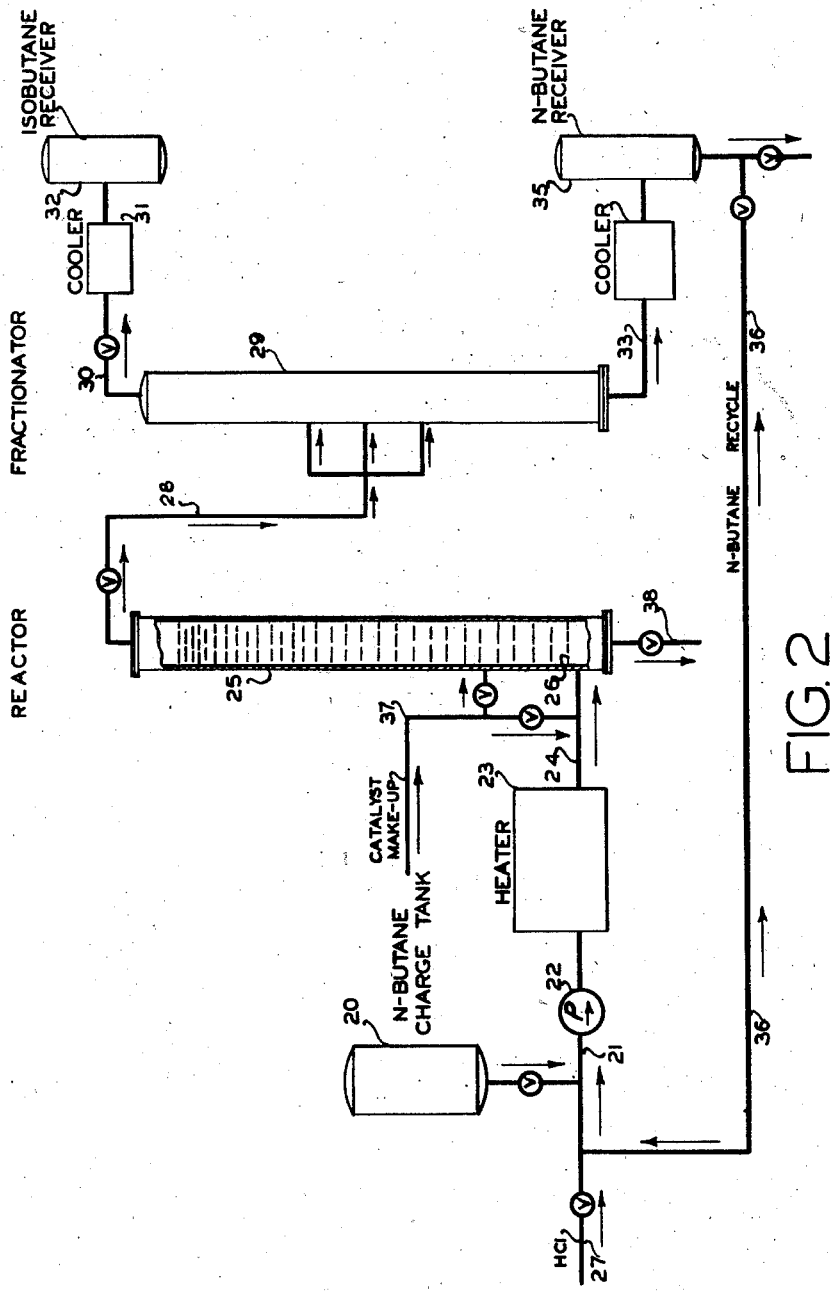

Patented Mar. 11, 1947

2,417,187

UNITED STATES PATENT OFFICE 2,417,187

CATALYTIC ISOMERIZATION OF SATURATED HYDROCARBONS IN THE PRESENCE OF AN ALUMINUM HALIDE-HYDROCARBON COMPLEX SATURATED WITH ALUMINUM HALIDE

John Richard Callaway, Teaneck, N. J., ass'gnor to The Texas Company, New York, N. Y., a corporation of Delaware Application May 28, 1943, Serial No. 488,811

5 Claims. (Cl. 260—683.5)

This invention relates to the conversion of hydrocarbons and has to do with isomerization of normal paraffins to isoparaffins. It is applicable particularly with respect to the isomerization of normal butane to isobutane.

Broadly the invention contemplates effecting conversion of the hydrocarbons by contact with a metallic halide type of catalyst such as anhydrous aluminum chloride in the presence of a hydrogen halide promoter such as hydrogen chloride under conditions suitable to effect substantial conversion of isoparaffins.

The present application is a continuation-in-part of my application, Serial No. 345,025, filed July 12, 1940, for Isomerization of normal paraffins.

The present application is concerned more particularly with effecting the isomerization reaction by the action of a metallic halide-hydrocarbon complex liquid catalyst. Thus, the reaction is effected during passage of the hydrocarbons in dispersed form through a column of liquid complex catalyst. The reaction may be effected with the hydrocarbons in either vapor phase, liquid phase or in mixed liquid and vapor phase.

In short, the catalyst consists essentially of metallic halide-hydrocarbon complex liquid formed by treating an aliphatic hydrocarbon with the metallic halide in the presence of hydrogen halide at elevated temperature. The resulting liquid may contain metallic halide in excess of the amount required to form complex, but is substantially free from suspended solid metallic halide or undissolved solid metallic halide. The liquid catalyst is free or substantially free of solids that would be separated by centrifuging at about 3000 R. P. M. for a period of one-half hour in an A. P. I. centrifuge at about normal room temperature.

The complex catalyst is maintained as a vertical column of liquid within a reaction tower through which the feed hydrocarbons undergoing isomerations are passed in dispersed form. The feed hydrocarbons are dispersed within the lower portion of the catalyst column either as bubbles of vapor or drops of liquid, and the dispersed hydrocarbons rise through the liquid catalyst column by difference in density and in the presence of the promoter. Thus the flow of hydrocarbons through the liquid column is unidirectional or substantially so. The column of liquid catalyst is maintained at the required reaction temperature which may be accomplished by heating the entering stream of feed hydrocarbon to approximately the reaction temperature, or somewhat below since the reaction is slightly exothermic.

Passage of the feed hydrocarbons through the catalyst liquid is effected without mechanical agitation so that the column of liquid is relatively quiescent compared to the conditions prevailing in a mechanically agitated reactor.

In the appended claims reference is made to a substantially static column of liquid catalyst, meaning that there is no agitation other than that caused by the bubbles of feed hydrocarbon rising through the column.

It is advantageous for the complex catalyst to be substantially free from undissolved solid aluminum halide and to be entirely in the liquid form since under these conditions the effluent stream of hydrocarbons issuing from the surface of the catalyst liquid is free or substantially free of metallic halide so that plugging of the hydrocarbon discharge pipes or conduits and condensing or cooling equipment is avoided or is so materially reduced as to be inconsequential.

Advantageously the catalyst activity is maintained by the continuous or intermittent addition of a small amount of metallic halide to the catalyst body. It may be added directly to the catalyst body or may be introduced as a solution in a portion of the entering hydrocarbon feed stream. The amount so added is regulated so that the complex catalyst liquid is not much more than saturated with metallic halide under which conditions the effluent stream of reacted hydrocarbons leaving the surface of the catalyst column remain substantially free from metallic halide.

The liquid volume ratio of catalyst to hydrocarbons undergoing treatment within the reaction zone is maintained not less than 1:1 and is usually substantially greater than unity irrespective of whether the hydrocarbons are undergoing treatment in either the liquid or the gas phase within the reaction zone. The dispersed bubbles or droplets of hydrocarbons undergoing treatment rise through the catalyst by difference in gravity and without substantial coalescence occurring so that each hydrocarbon particle is subjected to contact with the catalyst under identical or substantially identical conditions of reaction with respect to time of contact and manner of exposure to the active catalyst.

The invention will now be described in more detail by reference to the accompanying drawing. Fig. 1 of the drawing comprises a flow diagram for a two-stage operation, while Fig. 2 comprises a flow diagram for a single stage operation wherein the catalyst employed is entirely in the liquid form.

Referring to Fig. 1 a hydrocarbon feed, comprising mainly normal butane, is conducted from a source not shown through a pipe 1 to a heater 2 wherein the hydrocarbon feed is vaporized and heated to a temperature in the range 200 to 300° F.

The heated vapors are passed through a pipe 3 to the lower portion of a primary vessel 4. This vessel is maintained substantially filled with a fluid body comprising aluminum chloride-hydrocarbon complex, which body is maintained at a temperature in the range 200 to 300° F. If desired, some aluminum chloride, in granular form, may be introduced to the vessel through a conduit or inlet 5.

The vessel is provided with a stirrer 6 adapted to subject the fluid mass to sufficient agitation so as to maintain the solid aluminum chloride suspended uniformly throughout the mass. Such stirring is required only in the event that undissolved solid aluminum chloride is present in the catalyst liquid body.

Also, the hydrogen chloride may be added as a promoter through branch pipe 7.

The hydrocarbon vapors introduced through the pipe 3 bubble up through the fluid mass and in doing so remain in contact with the mass for a relatively short period of time, not in excess of about 5 to 10 minutes and which may be one minute or less.

The treated hydrocarbons pass out of the vessel 4 through a pipe 8 leading either to a heater 9 or a branch pipe 10. Where it is not desired to heat the heated hydrocarbons further they pass directly through the branch pipe 10 to a secondary vessel 11.

The vessel 11 is packed with aluminum chloride in solid pulverulent form. The vapors may pass either upwardly or downwardly through the catalyst mass or may be introduced thereto at a plurality of points, as indicated.

The reaction within the vessel 11 is effected at a temperature somewhat lower than that prevailing in the vessel 4, as, for example, 200 to 280° F., and preferably at a temperature of about 200 to 230° F., and with a contact time of about one to two minutes.

The converted hydrocarbons are removed either from the top or bottom of the vessel 11, depending upon the direction of flow employed, and are withdrawn through a pipe 12 having a pressure control valve 13.

The pressure maintained within the reaction zones may be about 165 pounds per square inch gauge or at a pressure below that at which the hydrocarbons undergoing treatment would be in the liquid phase.

The liquid material accumulating in the bottom of the vessel 11 comprises aluminum chloride hydrocarbon complex and may contain some free aluminum chloride dissolved therein. The accumulating complex liquid mixture is drawn off through a pipe 14 and returned, all or in part, to the bottom of the primary vessel 4, where it supplies the complex mixture required for the preliminary treatment.

As in the case of the primary treatment, the secondary treatment is also effected in the presence of a hydrogen chloride promoter introduced through a branch pipe 15.

It may be desired to maintain different conditions of pressure and temperature within the reaction vessels 4 and 11. For this reason a control valve 16 is placed in the pipe 10 leading from the vessel 4 to vessel 11. Also, a heater 9, previously mentioned, is provided through which all or a portion of the hydrocarbons passing from the vessel 4 may pass prior to entering the vessel 11.

While single reaction vessels, 4 and 11, have been shown in the drawing, it is, of course, contemplated that a plurality of such vessels may be used so as to permit substantially continuous operation. Thus the hydrocarbons undergoing treatment may be charged to one reaction vessel, while a parallel vessel is offstream for the purpose of filling with additional or fresh catalyst material.

It is also contemplated that the usual provision will be made for processing the isomerized hydrocarbons leaving the reaction vessel 11, including means for fractionation, whereby the unconverted butane or other normal paraffins may be separated and recycled through the system. Provision may be made for recovering hydrogen chloride from the conversion product, and returning it to the system for re-use.

Referring to Fig. 2 normal butane contained in a charge tank 20 is conducted through a pipe 21 and by means of a pump 22 passed through a heater 23 wherein it is raised to a temperature of about 210° F.

The heated normal butane is then passed through a pipe 24 leading to the lower portion of a reactor 25. The reactor 25 comprises a vertical tower containing a column of liquid aluminum halide complex catalyst substantially free from suspended or undissolved solid aluminum halide. The column of liquid catalyst may range in depth from 10 to 60 feet and is maintained at a reaction temperature of about 210° F. A perforated plate 26 may be positioned in the bottom portion of the reactor 25 for the purpose of facilitating uniform dispersion of the entering feed hydrocarbons throughout the horizontal cross-sectional area of the catalyst liquid. Various means for effecting mechanical dispersion of the feed hydrocarbons may be employed.

The dispersed hydrocarbons rise through the column of liquid catalyst in the presence of hydrogen chloride promoter. The promoter may be injected in the entering stream through a pipe 27 communicating with the previously mentioned pipe 21.

The feed hydrocarbons may be charged to the bottom of the reactor 25 at a flow rate, for example, ranging from 0.1 to 10 liquid volumes of feed hydrocarbon per volume of liquid catalyst, the feed hydrocarbon being measured as liquid at 60° F.

Advantageously the contact between rising feed hydrocarbons and catalyst liquid within the reactor 25 is effected without mechanical agitation so that the catalyst liquid is in a relatively quiescent or non-mechanically agitated state.

The reacted and unreacted hydrocarbons accumulate in the top of the reactor 25 and are continuously withdrawn through a pipe 28 leading to a fractionator 29 wherein isobutane may be fractionated from the unreacted normal butane. Provision may be made for introducing the reacted hydrocarbon stream to the fractionator at a plurality of successive points as indicated.

Fractionation is controlled so that a hydrocarbon stream rich in isobutane is removed as a distillate through a pipe 30 leading to a cooler and condenser 31 from which the resulting hydrocarbons may be discharged to a receiver 32. Provision may be made for subjecting the contents of the receiver 32 to further fractionation if desired.

A stream rich in normal butane is continuously drawn off from the bottom of the fractionator through a pipe 33 leading to a cooler 34 from which the cooled hydrocarbons are passed to a receiver 35. If desired all or a portion of the unreacted hydrocarbons may be recycled from the receiver 35 through a pipe 36 for return to the isomerization reaction.

The amount of promoter supplied to the reaction may amount to from about 1 to 5% by weight of the normal butane charged.

The reactor 25 may be maintained under pressure sufficient to maintain the butane undergoing treatment in the liquid phase. On the other hand the pressure may be sufficiently low to permit operating with the normal butane in the gas phase. Provision may also be made for the continuous or intermittent addition of small amounts of make-up aluminum halide through a conduit 37 for the purpose of maintaining the activity of the catalyst liquid and the conversion of the hydrocarbon at a uniform level. This make-up may be added as a solution in feed hydrocarbons and such solution may be added directly to the catalyst body or may be injected with the entering feed stream.

Likewise provision may be made for the continuous withdrawal of spent catalyst from the bottom of the reactor through a pipe 38 although provision may be made for withdrawal at some other point such as near the top of the catalyst column in the reactor.

By way of example a hydrocarbon feed of the following approximate composition:

|  | Per cent by weight |
|---|---|
| Propane | 0.3 |
| Isobutane | 11.0 |
| Normal butane | 87.3 |
| Normal pentane | 1.4 | was subjected to isomerization by bubbling in the gas phase through a liquid complex catalyst maintained as a non-mechanically agitated column of liquid catalyst within a reaction tower substantially as illustrated in Fig. 2.

The hydrocarbon feed containing about 2.5% by weight of hydrogen chloride was passed in a stream through a heater wherein it was heated to a temperature of about 240° F. under a pressure of about 165 pounds per square inch gauge. The heated stream of hydrocarbons was introduced to the lower portion of the liquid catalyst column at a flow rate of approximately .5 liquid volumes of feed hydrocarbon per hour per volume of catalyst and permitted to bubble upwardly through the column.

The catalyst column within the reaction tower was maintained at a temperature of about 210° F. and under a pressure of about 165 pounds per square inch.

Treated hydrocarbons containing isomerized hydrocarbons issued from the surface of the catalyst column in the upper part of the reaction tower and were continuously drawn off to a fractionating column. During a period of about 50 to 60 hours the isobutane content of the effluent stream of hydrocarbons amounted to about 34 mol per cent or more.

The complex catalyst liquid employed during this operation comprised a preformed complex formed by treating a portion of the feed hydrocarbon of the same composition with solid aluminum chloride in the presence of hydrogen chloride at a temperature of about 210° F. This was accomplished by filling the reaction tower with solid aluminum chloride of about 10 to 60 mesh and passing a stream of feed hydrocarbon vapor at a temperature of about 210° F. through the mass in the presence of hydrogen chloride amounting to 2.5% by weight of the feed hydrocarbon. The flow of feed hydrocarbon through the solid aluminum halide mass was continued until the mass was converted entirely to liquid complex substantially free from undissolved solid or suspended aluminum chloride.

During this liquid complex formation period isomerization of normal butane occurred, the effluent stream of hydrocarbons containing about 40 mol percent of isobutane.

When the aluminum halide had been converted entirely to the liquid complex form, the feed hydrocarbon flow was continued through the column of liquid catalyst as previously described and isomerization of normal butane was effected without the addition of any make-up solid aluminum halide.

Moreover, the yield of isobutane obtaining during the operation with the catalyst entirely in the liquid form compared favorably with that obtained during passage of the feed hydrocarbon under similar conditions of temperature and promoter concentration through the bed of solid aluminum halide catalyst. The yield of isobutane obtained with the liquid catalyst is at least the equivalent of that obtained with the solid catalyst when operating under comparable conditions of flow rate, namely, volumes of liquid feed hydrocarbon per hour per volume of catalyst. Even better yields of isobutane may be obtained with the liquid catalyst under the same conditions due to the apparent greater rapidity of the reaction with this type of catalyst. In addition with the liquid catalyst there is no migration of aluminum halide from the reaction zone, thereby avoiding the problem of aluminum halide accumulation in the discharge conduits and condensing equipment which is usually characteristic of operations with a solid aluminum halide catalyst.

While a temperature of about 210° F. is described in the specific example, nevertheless it is contemplated that isomerization of normal butane may be carried out at other temperatures within the range 160 to 240° F.

In commercial operations the flow of butane feed through the liquid catalyst is continued indefinitely and the catalyst activity is maintained by the continuous or intermittent addition of a small amount of aluminum halide which is thought to enter into reaction with a small amount of the feed hydrocarbon or fragments thereof to form complex in situ which in turn is effective as the catalyst.

Thus, in accordance with the invention isomerization is effected by the action of a catalyst consisting essentially of aluminum halide-hydrocarbon complex formed in situ by treating normal butane or other feed hydrocarbon in the presence of hydrogen chloride with aluminum halide at the isomerization reaction temperature. However, it is contemplated that a suitable complex catalyst may also be prepared by separately treating the metallic halide with aliphatic hydrocarbons in the presence of promoter under any suitable temperature conditions, obtaining a complex liquid which is preferably no more than saturated with the metallic halide. A suitable complex formed from aluminum halide for the isomerization of normal butane will have a density of about 1.30 to 1.5 grams per cubic centimeter.

Although a single liquid phase reaction tower has been described, nevertheless it is contemplated that a plurality of reaction towers may be employed if desired with either series or parallel flow of hydrocarbons through the towers and also provision may be made for passing used catalyst from one tower to another so that the flow of liquid catalyst through the system as a whole may be either countercurrent to or concurrent with the hydrocarbon flow.

While aluminum chloride has been mentioned above as a catalyst, it is contemplated that the process is not limited to the use of aluminum chloride. The method can be applied with other isomerization catalysts, including aluminum halides, and mixtures thereof.

While anhydrous hydrogen halides are used as promoters, singly or in mixtures with themselves or other promoters, hydrogen chloride, hydrogen bromide, hydrogen iodide and hydrogen fluoride are contemplated. The percentage of promoter added may range from about 0.1 to 20% by weight, basis feed hydrocarbon, while in the vessel 11 it may be about 0.1 to 20%.

Although particularly suitable for the isomerization of normal butane, it is contemplated that the process is applicable to the treatment of other low boiling hydrocarbons such as normal pentane, normal hexane, etc. or mixtures of hydrocarbons having 4, 5, 6 and 7 carbon atoms per molecule.

It is contemplated that the liquid catalyst as employed in this invention may be used for effecting conversion of other hydrocarbons into gasoline hydrocarbons of highly branched chain character.

However, the process is particularly useful in isomerizing normal paraffins or naphtha fractions consisting essentially of saturated non-aromatic hydrocarbons, that is, which are substantially free from olefinic and aromatic hydrocarbon constituents. Also, as previously indicated, it is desirable to employ a stationary non-mechanically stirred body of catalyst l'quid in the form of a vertical column of substantial height, the liquid catalyst being formed by reacting a metallic halide with a saturated non-aromatic hydrocarbon.

Obviously, many modifications and variations of the invention, as hereinbefore set forth, may be made without departing from the spirit and scope thereof, and therefore only such limitations should be imposed as are indicated in the appended claims.

I claim:

1. A continuous process for isomerizing normal butane which comprises maintaining in a reaction zone a substantially static column of liquid isomerization catalyst consisting of aluminum chloride-hydrocarbon complex catalyst substantially saturated with aluminum chloride but substantially free from solid aluminum chloride and formed by passing saturated C4 hydrocarbons in contact with aluminum chloride in the presence of a small amount of hydrogen chloride at a temperature in the range about 160 to 240° F., continuously injecting a feed stream consisting essentially of normal butane into the lower portion of said static column of liquid catalyst, dispersing the injected normal butane in discontinuous phase upwardly through the liquid column of catalyst in continuous phase by difference in density in the presence of a small amount of hydrogen chloride not exceeding about 5% by weight normal butane and at an elevated temperature not exceeding about 240° F., maintaining the liquid volume of the catalyst in the tower greater than that of the hydrocarbons undergoing treatment therein, maintaining said dispersed hydrocarbons in contact with the catalyst for not in excess of about 10 minutes, effecting substantial conversion of normal butane to isobutane in a single passage of feed hydrocarbon through the catalyst column, and issuing from the top of said liquid catalyst column an effluent stream of hydrocarbons containing a relatively large proportion of isobutane.

2. The method according to claim 1 in which the catalyst column is maintained at a temperature of about 210° F.

3. A continuous process for isomerizing normal butane which comprises maintaining in a reaction tower a substantially static column of liquid isomerization catalyst consisting essentially of aluminum chloride-hydrocarbon complex formed in situ by passing a stream consisting essentially of saturated C4 hydrocarbons in contact with aluminum chloride in the presence of a small amount of hydrogen chloride at a temperature in the range about 160 to 240° F., said catalyst being substantially saturated with aluminum chloride but substantially free from solid aluminum chloride, continuously injecting a feed stream of normal butane into the lower portion of said liquid column, dispersing the injected hydrocarbons in discontinuous phase upwardly through the liquid column of catalyst in continuous phase by difference in density in the presence of a small amount of hydrogen chloride not exceeding about 5% by weight of the feed hydrocarbons and at an elevated temperature not exceeding about 240° F. such that isomerization constitutes the principal reaction, maintaining the liquid volume of the catalyst in the tower greater than that of the hydrocarbons undergoing treatment therein, maintaining said dispersed hydrocarbons in contact with the catalyst for not in excess of about 10 minutes, issuing from the upper portion of said liquid catalyst column an effluent stream of hydrocarbons containing isobutane, and effecting at least about 26 mol per cent conversion of normal butane to isobutane in a single passage of feed hydrocarbon through the catalyst column.

4. A continuous process for isomerizing normal butane which comprises maintaining in a reaction tower a substantially static column of active liquid isomerization catalyst consisting essentially of aluminum halide-hydrocarbon complex formed by reacting aluminum halide with saturated C4 hydrocarbons, said complex being substantially saturated with aluminum halide and substantially free from suspended solid aluminum halide, continuously injecting normal butane to the lower portion of said tower, passing the injected butane in dispersed form upwardly through the column of catalyst in continuous phase by difference in density in the presence of hydrogen halide amounting to not in execss of about 5% by weight of the normal butane and at an elevated temperature not exceeding about 240° F., maintaining the liquid volume of the catalyst in the tower substantially greater than that of the hydrocarbons undergoing treatment therein, maintaining the depth of catalyst liquid through which the dispersed hydrocarbons rise in the range about 10 to 60 feet, continuously issuing from the top of said catalyst column a stream of hydrocarbons containing a relatively large proportion of isobutane, and effecting at least about 26 mol per cent conversion of normal butane to isobutane in a single passage of feed hydrocarbons through the catalyst column.

5. A continuous process for isomerizing saturated non-aromatic hydrocarbons which comprises maintaining in a reaction tower a substantially static column of active liquid isomerization catalyst consisting essentially of aluminum halide-hydrocarbon complex formed by reacting aluminum halide with a portion of the said saturated non-aromatic hydrocarbons of substantially the same composition, said complex liquid being substantially saturated with aluminum halide but substantially free from suspended solid aluminum halide, continuously injecting a feed stream consisting essentially of said saturated non-aromatic hydrocarbons into the lower portion of the static column of liquid catalyst, dispersing the injected saturated non-aromatic hydrocarbons in discontinuous phase upwardly through the liquid column of catalyst in continuous phase by difference in density in the presence of a small amount of hydrogen halide not exceeding about 5% by weight of the hydrocarbon feed and at an elevated temperature not exceeding about 240° F. such that isomerization of said saturated non-aromatic hydrocarbons to more highly branched saturated non-aromatic hydrocarbons constitutes the principal reaction, maintaining the liquid volume of the catalyst in the tower greater than that of the hydrocarbons undergoing treatment therein, maintaining the depth of catalyst liquid through which the dispersed hydrocarbons rise within the range of about 10 to 60 feet while providing a time of contact of the dispersed hydrocarbons with the catalyst not in excess of about 10 minutes, and issuing from the top of said liquid catalyst column an effluent hydrocarbon stream, thereby effecting substantial conversion of said saturated non-aromatic hydrocarbons to more highly branched saturated non-aromatic hydrocarbons in a single passage of feed hydrocarbons through the liquid catalyst column.

JOHN RICHARD CALLAWAY.

REFERENCES CITED

The following references are of record in the file of this patent:

UNITED STATES PATENTS

| Number | Name | Date |
|---|---|---|
| 2,266,012 | d'Ouville et al. | Dec. 16, 1941 |
| 2,250,118 | Smithuysen | July 22, 1941 |
| 2,266,011 | d'Ouville et al. (B) | Dec. 14, 1938 |